(12) United States Patent
Awazu et al.

(10) Patent No.: US 7,764,874 B2
(45) Date of Patent: Jul. 27, 2010

(54) IMAGE-TAKING APPARATUS

(75) Inventors: Kouhei Awazu, Asaka (JP); Atsushi Misawa, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1010 days.

(21) Appl. No.: 11/506,888

(22) Filed: Aug. 21, 2006

(65) Prior Publication Data

US 2007/0047935 A1 Mar. 1, 2007

(30) Foreign Application Priority Data

Aug. 30, 2005 (JP) ............................ 2005-249147

(51) Int. Cl.
*G03B 17/00* (2006.01)
*H04N 5/228* (2006.01)

(52) U.S. Cl. ................ 396/55; 348/208.99; 348/208.11

(58) Field of Classification Search ..................... 396/55
See application file for complete search history.

(56) References Cited

U.S. PATENT DOCUMENTS 5,835,796 A * 11/1998 Miyamoto et al. ............. 396/48
2009/0208194 A1 * 8/2009 Honjo et al. .................. 396/55

FOREIGN PATENT DOCUMENTS

| JP | 8-304868 A | 11/1996 |
| JP | 09-211520 A | 8/1997 |
| JP | 2005-173372 A | 6/2005 |

OTHER PUBLICATIONS

Machine English translation of JP 08-304868, 49 pages, Nov. 22, 1996, cited on applicant's IDS of Aug. 21, 2006.*
JP Communication, dated Dec. 21, 2009, issued in corresponding JP Application No. 2005-249147, 3 pages in Japanese.

* cited by examiner

*Primary Examiner*—Melissa J Koval
(74) *Attorney, Agent, or Firm*—Sughrue Mion, PLLC

(57) ABSTRACT

An image-taking apparatus includes: a CCD having an imaging surface; and an image-taking optical system having an objective lens. The apparatus further includes: a shake detector that detects a shake of the image-taking apparatus; and a correction lens disposed between the objective lens and the CCD and moving in parallel with the imaging surface to correct a blur in an image formed on the imaging surface caused by the shake of the image-taking apparatus. The apparatus further includes: an electromagnet disposed behind the CCD and driving the correction lens; a power transmission system that moves the correction lens by transmitting power from the electromagnet to the correction lens; and a correction-lens controller that causes, based on a detection result from the shake detector, the electromagnet to drive the correction lens such that an image whose blur due to the shake is corrected is formed on the imaging surface.

5 Claims, 8 Drawing Sheets

IMAGE-TAKING APPARATUS

BACKGROUND OF THE INVENTION

1. Field of the Invention

The present invention relates to an image-taking apparatus that generates shooting data in response to shooting operation and includes: an imaging device that has an imaging surface and generates image data by reading a subject image formed on the imaging surface; and an image-taking optical system that has an objective lens and a reflection member and forms an image on the imaging surface by reflecting subject light coming through the objective lens with the reflection member.

2. Description of the Related Art

Digital camera is known as one of the image-taking apparatus. In recent years, attention has been focused on digital cameras that are small as well as slim and thus convenient to carry.

Generally, a digital camera is made smaller by reducing the sizes of components such as lenses in a shooting optical system, members for supporting such components and drivers used in the image-taking optical system. These components, members and drivers reduced in size are densely packed in a small body of the digital camera.

However, when it comes to a conventional digital camera having: a charge-coupled device (CCD) that is one type of the imaging device; and linearly arranged lenses that form an image of subject light coming through an objective lens on an imaging surface of the CCD, there is a problem that it is difficult to thin the camera body even if it can be made smaller. Such a problem has been solved by incorporating in the camera body a refractive optical system that is one of the shooting optical systems for forming an image on the imaging surface of the CCD, so that the camera body can be made slim. The refractive optical system includes a refractive member such as a prism that refracts light coming through the objective lens to change the direction of the light.

However, it is more difficult for a user to hold still such a slim type of digital camera provided with a refractive optical system (refractive type of digital camera), as compared to the digital camera provided with a shooting optical system having linearly arranged lenses (linear type of digital camera). Therefore, when the refractive type of digital camera is in use, camera shake is very likely to occur when a release button is pressed. Additionally, the linear type of digital camera is not free from camera shake either and therefore, it has been desired to provide a shake correction function in the camera body. Accordingly, digital cameras of the linear type are already provided with a shake correction function and available on the market. In contrast, even though the refractive type of digital camera is more susceptible to camera shake, a shake correction function for curing such susceptibility is not yet devised and thus desired.

As a means for correcting camera shake, the linear type of digital camera has a shake correction lens in the shooting optical system. In order to move the correction lens while keeping it parallel with the imaging surface of the CCD, there is proposed, for example, an electromagnetic actuator that moves the correction lens by using electromagnets disposed around the correction lens as a driver (see Japanese Patent Application Publication No. 8-304868, page 24, FIG. 1, for example).

The electromagnetic actuator of the Japanese Patent Application Publication No. 8-304868 corrects camera shake by moving the correction lens with precision.

It is conceivable to realize a slim type of digital camera by using the technique disclosed in Japanese Patent Application Publication No. 8-304868. However, the digital camera employing a refractive optical system needs space in the thickness direction of the camera body to accommodate drivers for driving a zoom lens, a focus lens, a diaphragm, a shutter etc., in which the drivers are disposed around the lenses of the refractive optical system. Therefore, it is difficult to add a driver for shake correction without further increasing the thickness of the camera body.

SUMMARY OF THE INVENTION

The present invention has been made in view of the above circumstances, and provides an image-taking apparatus having a refractive optical system, which is reduced in thickness while having a shake correction function.

An image-taking apparatus according to the invention is an apparatus that generates shooting data in response to shooting operation and includes: an imaging device that has an imaging surface and generates image data by reading a subject image formed on the imaging surface; and an image-taking optical system that has an objective lens and a reflection member and forms the subject image on the imaging surface by reflecting subject light coming through the objective lens with the reflection member, the apparatus further including:

a shake detection section that detects a shake of the image-taking apparatus;

a correction lens that is disposed between the objective lens and the imaging device and capable of moving in parallel with the imaging surface thereby correcting a blur in a subject image formed on the imaging surface caused by the shake of the image-taking apparatus;

a driver that is disposed behind the imaging device and drives the correction lens;

a power transmission system that moves the correction lens by transmitting power from the driver to the correction lens; and a correction-lens control section that causes, based on a result of detection by the shake detection section, the driver to drive the correction lens such that a subject image whose blur due to the shake is corrected is formed on the imaging surface.

In the image-taking apparatus of the invention, the driver for correcting a shake is disposed behind the imaging device. In a conventional image-taking apparatus having a refractive optical system, drivers are disposed around lenses and therefore, space behind an imaging device is wasted. The invention realizes a thinner image-taking apparatus by making effective use of dead space behind the imaging device. Accordingly, the image-taking apparatus of the invention can correct a shake by driving the correction lens based on a result of detection by the shake detection section, thereby generating excellent shooting data, such that a subject image whose blue due to the shake is corrected is formed on the imaging surface.

In the image-taking apparatus according to the invention, the power transmission system may include a lens-supporting arm that supports the correction lens by passing close by a side of the imaging device while extending in parallel with an optical axis of subject light reflected on the reflection member, the lens-supporting arm having a pivot near the side of the imaging device and moving the correction lens, in response to an action of the driver, while keeping the correction lens in parallel with the imaging surface.

When the lens-supporting arm is provided, it is possible to simply configure the power transmission system that transmits power from the driver disposed behind the imaging device to the correction lens.

In the image-taking apparatus according to the invention, the power transmission system may include a pair of the lens-supporting arms for sandwiching the imaging device, which move the correction lens by tuning on the respective pivots while remaining parallel to each other and keeping the correction lens in parallel with the imaging surface in response to a driving force from the driver.

When the pair of lens-supporting arms are provided, it is possible to precisely move the correction lens because these lens-supporting arms move in cooperation with each other, serving as a parallel linking system.

In the image-taking apparatus according to the invention, the driver may be an electromagnet that applies an electromagnetic force to the lens-supporting arms.

When the electromagnet serving as the driver for correcting a shake is disposed behind the imaging device, it is possible to readily move the correction lens via the pair of lens-supporting arms by use of an electromagnetic force applied by the electromagnet.

In the image-taking apparatus according to the invention, the driver may include a cam for rotating the lens-supporting arms according to an attitude of the cam.

When the image-taking apparatus is configured such that the correction lens is moved by the rotation of the cam, it is possible to further suppress noise contained in the image data generated by the imaging device, as compared to the case where the electromagnet is used.

In the image-taking apparatus according to the invention, the correction lens may be supported by the lens-supporting arm as well as a spring fixed to a wall, and the driver may drive the correction lens so that the correction lens moves while resisting a force of the spring.

In such a configuration that the correction lens moves while resisting a force of the spring, noise contained in the image data generated by the imaging device can be further suppressed as well, as compared to the case where the electromagnet is used.

As described above, it is possible to provide an image-taking apparatus having a refractive optical system, which is reduced in thickness while having a shake correction function.

DETAILED DESCRIPTION OF THE INVENTION

Embodiments of the present invention will be described with reference to the drawings.

Figure 1:
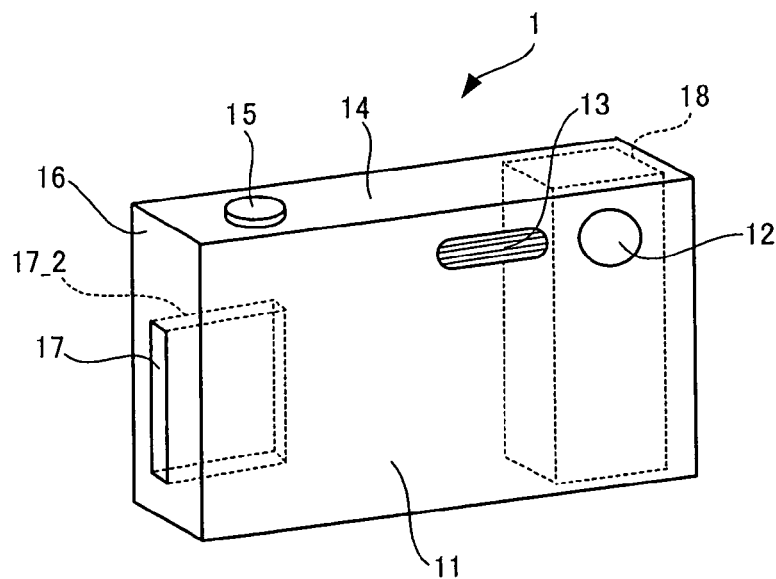
FIG. 1 is an external perspective view of a digital camera according to a first embodiment of the invention.

FIG. 1 is an external perspective view of a digital camera 1 according to a first embodiment of the invention.

Figure 2:
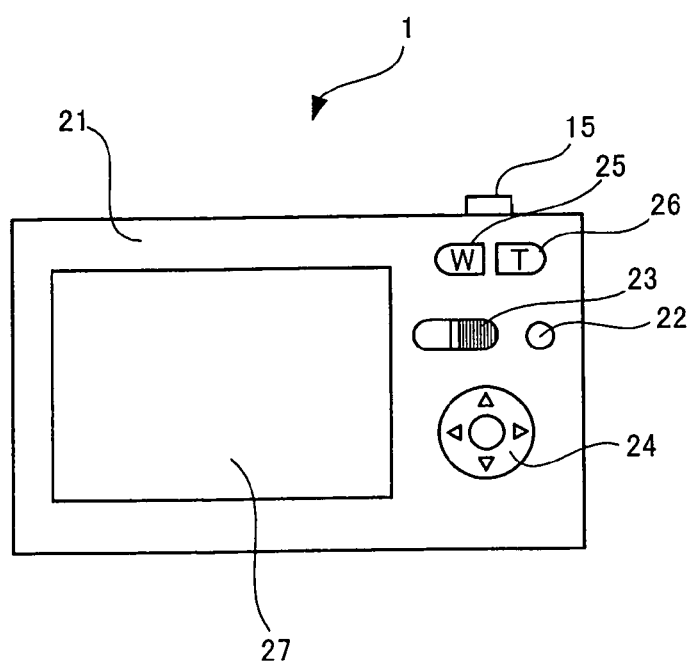
FIG. 2 is a diagram showing the back of the digital camera shown in FIG. 1.

FIG. 2 is a diagram showing the back of the digital camera 1 shown in FIG. 1.

As shown in FIG. 1, a front surface 11 of the digital camera 1 is provided with an objective lens 12 for guiding subject light to a lens group disposed inside the digital camera 1, a flash window 13 through which a flash is emitted to a subject. A top surface 14 of the digital camera 1 is provided with a release button 15. A still image is taken at the press of the release button 15.

Formed on a side surface 16 of the digital camera 1 is a recording-media slot 17 into which a recording medium 17_2 for recording image data is removably inserted.

Disposed inside the digital camera 1 is a refractive optical system 18, which will be described later in detail.

As shown in FIG. 2, a back surface 21 of the digital camera 1 is provided with a power button 22 and a mode switch 23. The power button 22 is used to turn on/off the power of the digital camera 1, and the mode switch 23 is used to switch between a shooting mode and a playback mode.

The back surface 21 is also provided with a menu-selection/execution key 24. The key 24 allows a user to select a setting condition from among menus for still-image shooting and movie shooting in the shooting mode and for still-image playback and movie playback in the playback mode, and then to execute the selected condition.

The back surface 21 is further provided with a wide-angle zoom key 25, a telephoto zoom key 26 and a liquid crystal display (LCD) panel 27. The wide-angle zoom key 25 is used to change the focal length to the wide-angle side, whereas the key telephoto zoom 26 is used to change the focal length to the telephoto side. The LCD panel 27 is used to display an image of a subject and a menu etc. for the menu-selection/execution key 24.

Next, the internal configuration of the digital camera 1 will be described.

Figure 3:
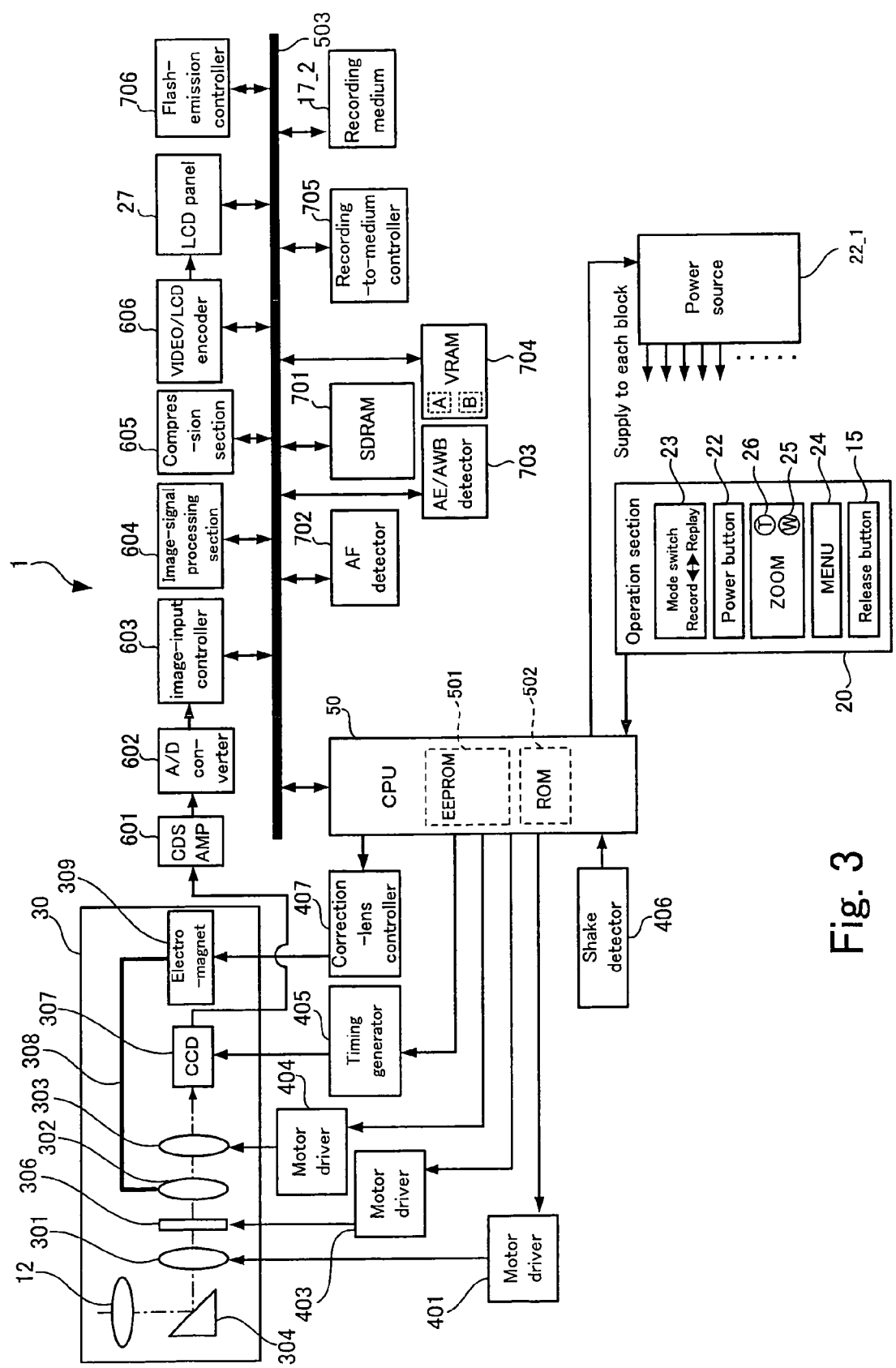
FIG. 3 is a block diagram illustrating the internal configuration of the digital camera shown in FIGS. 1 and 2.

FIG. 3 is a block diagram illustrating the internal configuration of the digital camera 1 shown in FIGS. 1 and 2.

The digital camera 1 includes an image-taking section 30 composed of an objective lens 12, a zoom lens 301, a correction lens 302 and a focus lens 303. The zoom lens 301 is composed of two or more lenses but it is schematically illustrated as one lens for convenience of explanation. The zoom lens 301 serves as a lens for adjusting the angle of view for shooting, and the focus lens 303 serves as a lens for bringing a subject into focus. The correction lens 302 serves as a lens for correcting a shake and will be described later more in detail.

Provided between the objective lens 12 and the zoom lens 301 is a prism 304 for refracting subject light coming through the objective lens 12.

The image-taking section 30 is also provided with a mechanical shutter 306 and a charge-coupled device (CCD) 307.

The mechanical shutter 306 serves as a device for reducing or shielding subject light passing through the correction lens 302.

The CCD 307 corresponds to an example of the "imaging device" according to the invention and is a solid imaging device for capturing subject light coming through the objective lens 12.

The image-taking section 30 is also provided with a power transmission system 308 and an electromagnet 309. The electromagnet 309 is a driver of the digital camera 1 according to the first embodiment of the invention. The power transmission system 308 and the electromagnet 309 will be described later.

The digital camera 1 also includes a motor driver 401 for zooming, a motor driver 403 for mechanical shutter, a motor driver 404 for focusing and a timing generator 405.

The motor driver 401 is a driver for driving the zoom lens 301, the motor driver 403 is a driver for opening/closing the mechanical shutter 306, and the motor driver 404 is a driver for driving the focus lens 303. The timing generator 405 is an element to notify the CCD 307 of an exposure starting/ending time, corresponding to the so-called shutter speed.

The digital camera 1 also includes a shake detector 406 and a correction-lens controller 407. The shake detector 406 is provided with an acceleration sensor to detect movements of the digital camera 1 caused by camera shake. The correction-lens controller 407 is a controller for causing, based on a result of detection performed by the shake detector 406, the electromagnet 309 to drive the correction lens 302 so that a blur-corrected subject image can be formed on an imaging surface of the CCD 307.

The digital camera 1 also includes a CPU 50 having an EEPROM 501 that is a rewritable nonvolatile memory. The CPU 50 has a built-in ROM 502 where a program is stored. The CPU 50 controls the operation of the digital camera 1 according to procedures described in this program.

The digital camera 1 also includes a CDSAMP 601 and an A/D converter 602. The CDSAMP 601 performs processing such as processing for reducing noise of analog image signals output from the CCD 307, and the A/D converter 602 converts the analog image signals into digital image signals.

The digital camera 1 also includes an image-input controller 603 for transferring image data represented by the digital image signals output from the A/D converter 602 to a SDRAM 701 via a data bus 503. The SDRAM 701 is a memory where the image data is temporarily stored.

The digital camera 1 further includes an AF detector 702 and an AE/AWB detector 703. The AF detector 702 detects focus information on an image and the AE/AWB detector 703 detects brightness information and white-balance information on the image.

The digital camera 1 further includes an image-signal processing section 604 for subjecting the image data stored in the SDRAM 701 to image processing.

The digital camera 1 further includes a compression section 605 and a VRAM 704. The compression section 605 compresses the image data after being subjected to the image processing by the image-signal processing section 604. The VRAM 704 is a memory for retaining contents to be displayed on the LCD panel 27 and has two buffer areas A and B. The digital camera 1 also includes a Video/LCD encoder 606, a recording-to-medium controller 705 and a flash-emission controller 706. The Video/LCD encoder 606 converts the image data into video signals and leads the video signals to the LCD panel 27. The recording-to-medium controller 705 controls recording of the image data on the recording medium 17_2. The flash-emission controller 706 controls emission of a flash to be emitted through the flash window 13.

The digital camera 1 further includes an operation section 20 and a power source 22_1. In response to each of the operating members being operated, which are disposed on the back surface 21 and the top surface 14 of the digital camera 1 described with reference to FIG. 2, the operation section 20 sends a command for performing processing represented by the operated member to the CPU 50. The power source 22_1 supplies power to each block in response to turning-on of the power.

Next, there will be described the refractive optical system 18 of the digital camera 1 according to the first embodiment of the invention with reference to FIG. 4.

Figure 4:
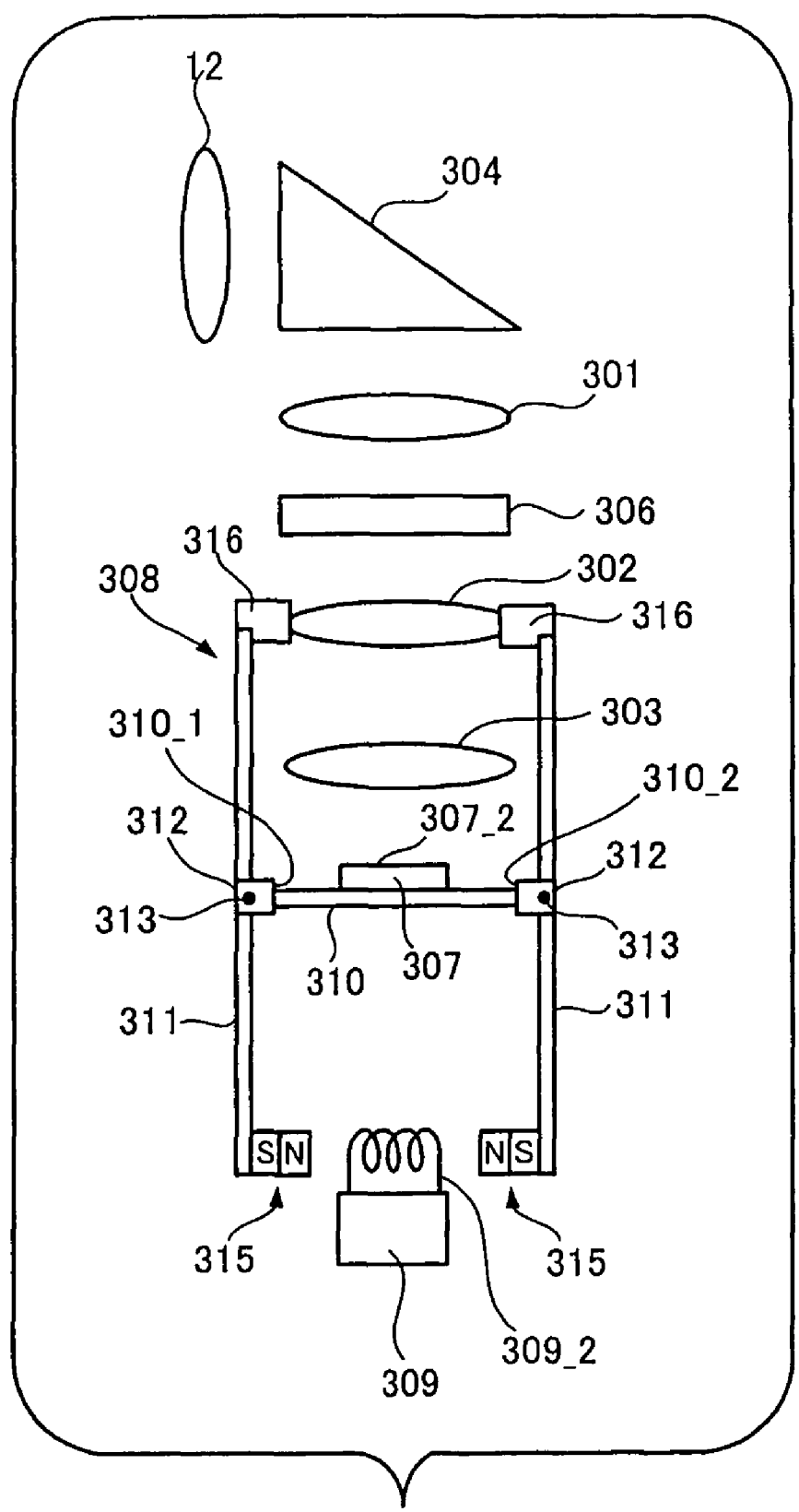
FIG. 4 is a cross-sectional diagram of a refractive optical system provided in the digital camera according to the first embodiment of the invention.

FIG. 4 is a cross-sectional diagram of the refractive optical system 18 provided in the digital camera 1 according to the first embodiment of the invention.

As shown in FIG. 4, the refractive optical system 18 is a system employing the prism 304. In this optical system, subject light passing through the objective lens 12 is reflected on the prism 304 in the direction approximately perpendicular to an optical axis of the objective lens 12. The reflected light then reaches the CCD 307 after passing through the zoom lens 301, the correction lens 302 and the focus lens 303, so that an image is formed on the imaging surface 307_2 of the CCD 307 disposed on a mount 310. The electromagnet 309 generates an electromagnetic force via a coil 309_2.

The power transmission system 308 is provided with lens-supporting arms 311 that move the correction lens 302, in response to the action of the electromagnet 309, while keeping the lens 302 parallel with the imaging surface 307_2. The structure of the lens-supporting arms 311 will be described below with reference to FIGS. 5 and 6.

Figure 5:
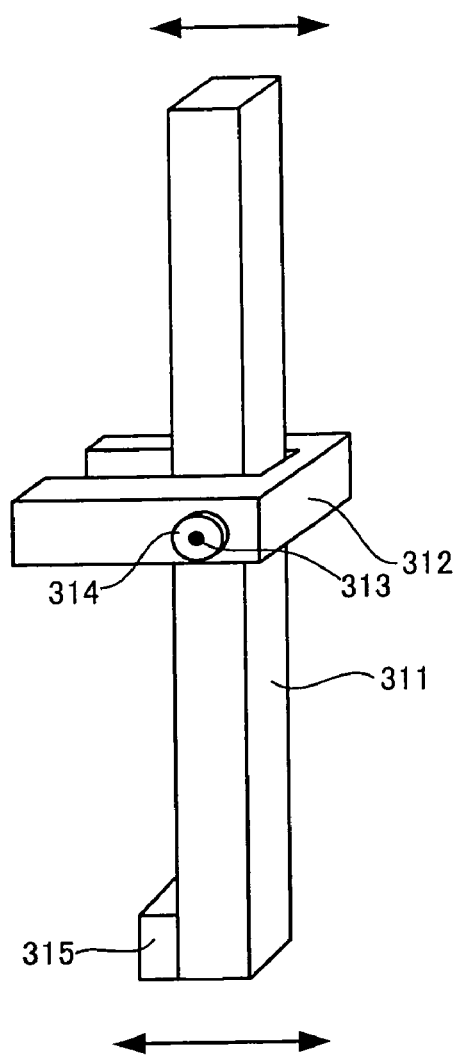
FIG. 5 is a diagram showing a lens-supporting arm and a support frame for supporting the lens-supporting arm, as obliquely viewed from the front.
Figure 6:
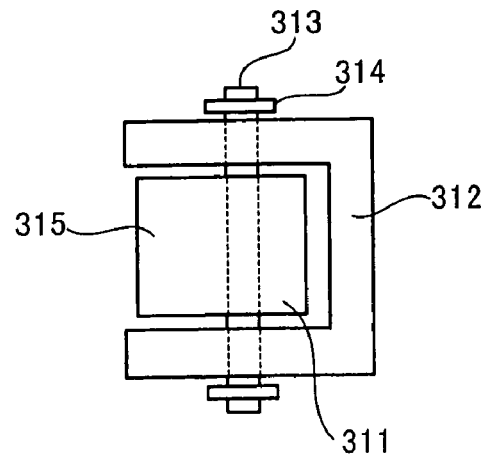
FIG. 6 is a diagram showing the lens-supporting arm and the support frame, as obliquely viewed from above.

FIGS. 5 and 6 are diagrams showing the lens-supporting arm 311 and a support frame 312 for supporting the lens-supporting arm 311, as obliquely viewed from the front and as viewed from above, respectively.

The lens-supporting arm 311 has an opening through which a shaft 313 is inserted. The shaft 313 is retained by shaft-retaining members 314 so that the lens-supporting arm 311 is supported by the support frame 312. The lens-supporting arm 311 can turn on the shaft 313 serving as a pivot.

Disposed on a side surface of the lower end of the lens-supporting arm 311 is a magnet 315 for receiving the action the electromagnet 309.

Returning to FIG. 4, the description will be continued.

The power transmission system 308 has the two lens-supporting arms 311 that extend in parallel with the optical axis of the subject light reflected on the prism 304, passing close by both sides of the CCD 307. These lens-supporting arms 311 support the correction lens 302 via a lens holder 316 holding the correction lens 302. One of the lens-supporting arms 311 is joined to one end 310_1 of the mount 310 while the other one of the lens-supporting arms 311 is joined to the other end 310_2 of the mount 310.

Now, the operation of the power transmission system 308 will be described below.

Figure 7:
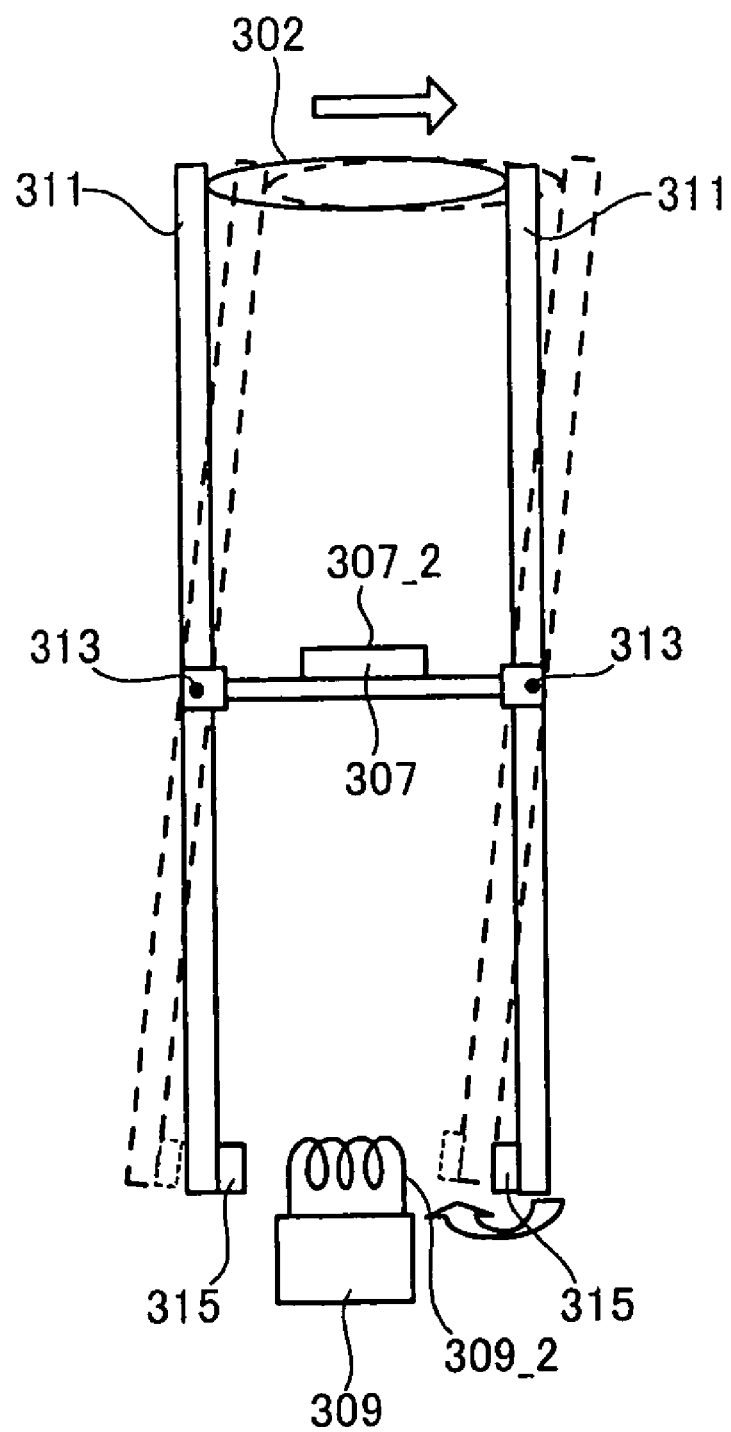
FIG. 7 is a conceptual diagram showing the operation of a power transmission system of the digital camera according to the first embodiment of the invention.

FIG. 7 is a conceptual diagram showing the operation of the power transmission system 308 of the digital camera 1 according to the first embodiment of the invention.

Upon generation of a magnetic force by the coil 309_2 of the electromagnet 309, the magnet 315 disposed at each of the lens-supporting arms 311 receives attraction or repulsion. Accordingly, the lens-supporting arms 311 move the correction lens 302 by turning on the shaft 313 while keeping the lens 302 parallel with the imaging surface 307_2.

Next, there will be described shooting operation of the digital camera 1 according to the first embodiment of the invention.

A case where a user shoots a still image will be described.

The CPU 50 controls the entire shooting operation of the digital camera 1.

First, upon a press of the power button 22 by a user, the operation section 20 accepts this power-turning-on operation, the CPU 50 starts running the program stored in the ROM 502, and the LCD panel 27 displays an image and becomes ready to accept user operation for setting a shooting condition or a press of the release button 15.

Figure 8:
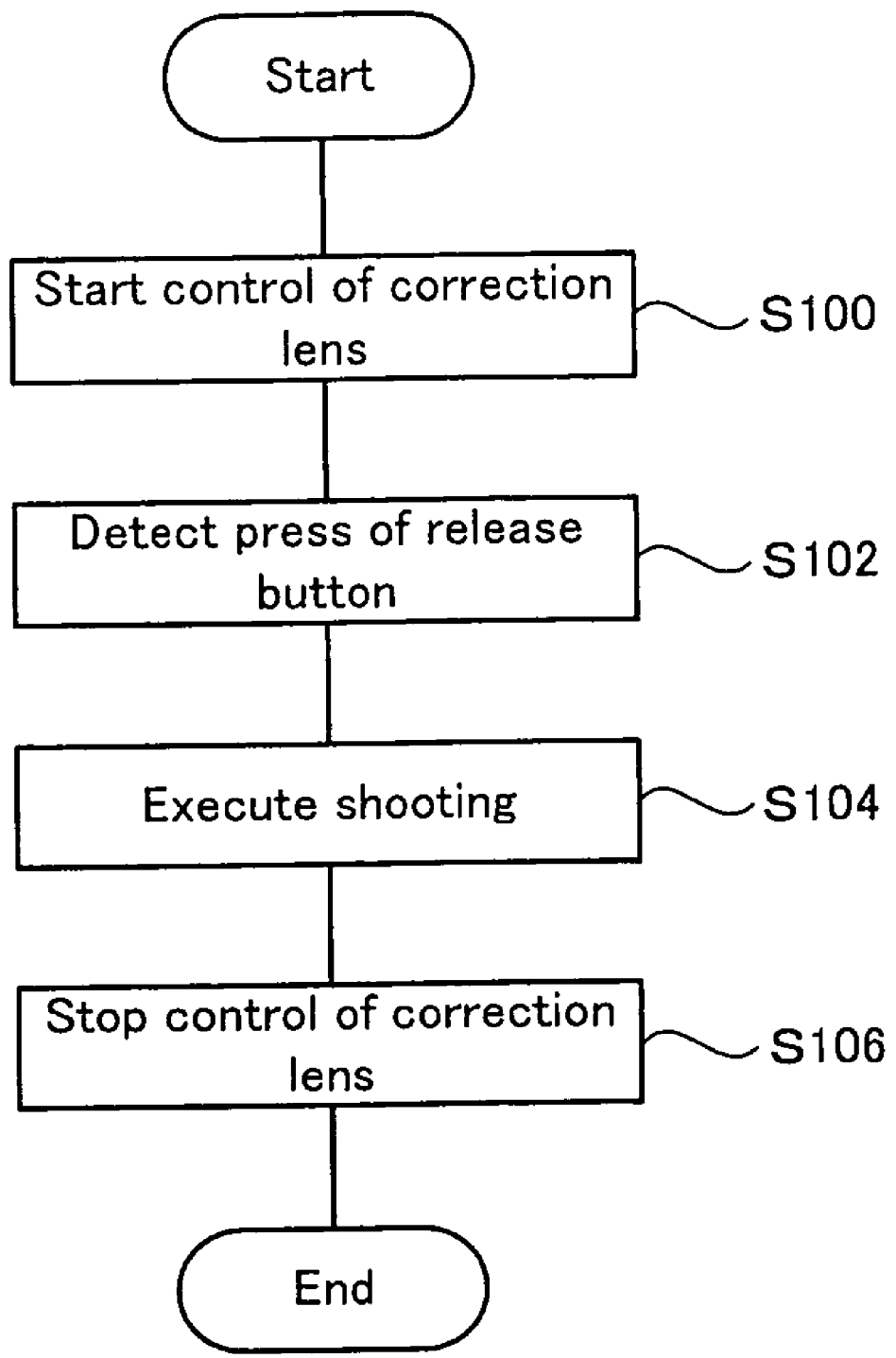
FIG. 8 is a flowchart showing a processing routine for correcting a shake of the digital camera according to the first embodiment of the invention.

After the user sets a shooting condition by operating the menu-selection/execution key 24, a processing routine as shown in FIG. 8 for correcting a shake of the digital camera 1 begins upon a half press of the release button 15 by the user.

FIG. 8 is a flowchart showing the processing routine for correcting a shake of the digital camera 1 according to the first embodiment of the invention.

First, at step S100, the shake detector 406 activates the acceleration sensor thereof to start processing by the correction-lens controller 407.

The correction-lens controller 407 moves the correction lens 302 according to a result of detection by the acceleration sensor. Specifically, based on a result of detection obtained by the shake detector 406, the correction-lens controller 407 drives the electromagnet 309 so that the electromagnet 309 generates a magnetic force via the coil 309_2. In response, as described above with reference to FIG. 7, the magnet 315 disposed at each of the lens-supporting arms 311 receives attraction or repulsion and accordingly, the lens-supporting arms 311 turn on the shaft 313 to move the correction lens 302 while keeping the lens 302 parallel with the imaging surface 307_2.

After the correction-lens controller 407 has started the processing, upon a press of the release button 15 (step S102), the flow proceeds to step S104.

At step S104, shooting is performed and the CCD 307 obtains analog image signals generated by the shooting.

The flow proceeds to step S106 upon completion of the shooting.

At step S106, the shake detector 406 turns the acceleration sensor off. Subsequently, the correction-lens controller 407 returns the correction lens 302 to the initial position when the correction lens 302 is moved off the initial position and then, the processing routine for correcting camera shake ends.

Meanwhile, the analog image signals obtained by the CCD 307 are subjected to processing such as noise reduction processing by the CDSMP 601 and then converted into digital image signals by the A/D converter 602. Data represented by the digital image signals is transferred as image data to the SDRAM 701 via the data bus 503 by the image-input controller 603.

Subsequently, the AE/AWB detector 703 detects brightness information and white-balance information on the image data transferred to the SDRAM 701. Based on such information, the image data is subjected to image processing by the image-signal processing section 604.

After being subjected to the image processing by the image-signal processing section 604, the image data is compressed by the compression section 605 and then stored in the VRAM 704. The image data stored in the VRAM 704 is converted into video signals by the Video/LCD encoder 606 and led to the LCD panel 27. Therefore, it is possible for the user to look at an image whose blue due a shake is corrected even if the shake has occurred while the user shot the image.

Next, a second embodiment of the invention will be described.

The description of a digital camera according to the second embodiment of the invention will focus on a feature different from the digital camera 1 of the first embodiment. The same elements of the second embodiment as those of the first embodiment are denoted by the same reference characters as those of the first embodiment.

Figure 9A:
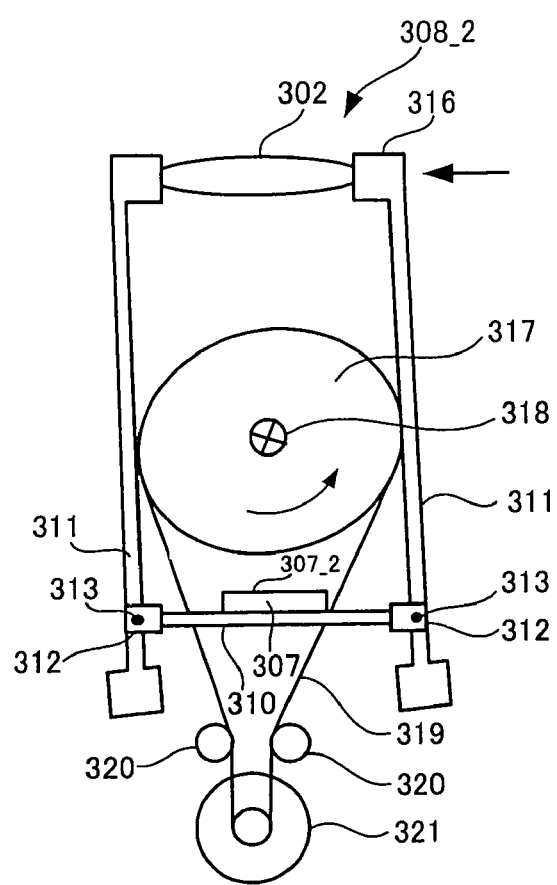
FIGS. 9(a) and 9(b) are conceptual diagrams showing the operation of a power transmission system of a digital camera according to a second embodiment of the invention.
Figure 9B:
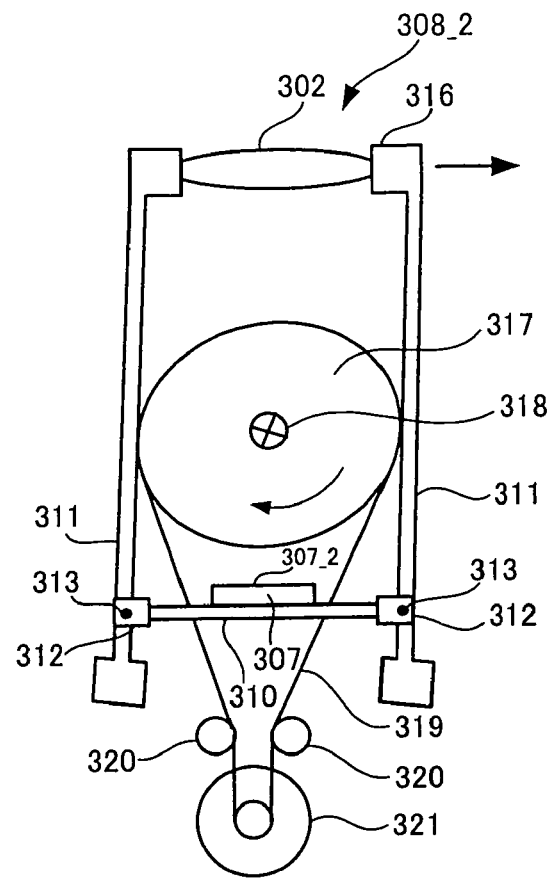

FIGS. 9(*a*) and 9(*b*) are conceptual diagrams showing the operation of a power transmission system 308_2 of the digital camera according to the second embodiment of the invention.

The digital camera according to the second embodiment of the invention is provided with the power transmission system 308_2 having an oval cam 317.

In the power transmission system 308_2, the oval cam 317 is disposed between lens-supporting arms 311 while being supported by a rotation shaft 318. Part of the cam 317 is in contact with the two lens-supporting arms 311. A rotation belt 319 for rotating the cam 317 is attached to a motor 321 via pulleys 320. The motor 321 is a driver in the second embodiment. The rotation of the motor 321 causes the cam 317 to rotate via the rotation belt 319 and accordingly, the motor 321 can turn the lens-supporting arms 311.

As shown in FIG. 9(*a*), when the cam 317 is rotated counterclockwise, the correction lens 302 moves towards the left side while remaining parallel with an imaging surface 307_2. Meanwhile, as shown in FIG. 9(*b*), when the cam 317 is rotated clockwise, the correction lens 302 moves towards the right side while remaining parallel with the imaging surface 307_2.

Now, there will be described the operation of the digital camera according to the second embodiment of the invention.

The flowchart shown in FIG. 8 is also applied to the digital camera of the second embodiment. What is different from the flowchart of the digital camera in the first embodiment is a means of controlling the correction lens, which will be described below.

Similar to the first embodiment described above, at step S100, a shake detector 406 activates an acceleration sensor thereof to start processing by a correction-lens controller 407.

The correction-lens controller 407 moves the correction lens 302 according to a result of detection by the acceleration sensor. Specifically, based on a result of detection obtained by the shake detector 406, the correction-lens controller 407 rotates the motor 321 thereby rotating the cam 317 via the rotation belt 319. Accordingly, the lens-supporting arms 311 move the correction lens 302 while keeping the lens 302 parallel with the imaging surface 307_2 so that a subject image whose blur due to camera shake is corrected can be formed.

After the correction-lens controller 407 has started the processing, upon a press of a release button 15 (step S102), the flow proceeds to step S104.

At step S104, shooting is performed and a CCD 307 obtains analog image signals generated by the shooting.

The flow proceeds to step S106 upon completion of the shooting.

At step S106, the shake detector 406 turns the acceleration sensor off. Subsequently, the correction-lens controller 407 returns the correction lens 302 to the initial position when the correction lens 302 is moved off the initial position, and the processing routine for correcting camera shake ends.

The operation thereafter is the same as that of the digital camera 1 in the first embodiment and therefore, the description thereof will be omitted.

Next, a third embodiment of the invention will be described.

The description of a digital camera according to the third embodiment will also focus on a feature different from the digital camera 1 of the first embodiment. The same elements of the third embodiment as those of the first embodiment are denoted by the same reference characters as those of the first embodiment.

Figure 10:
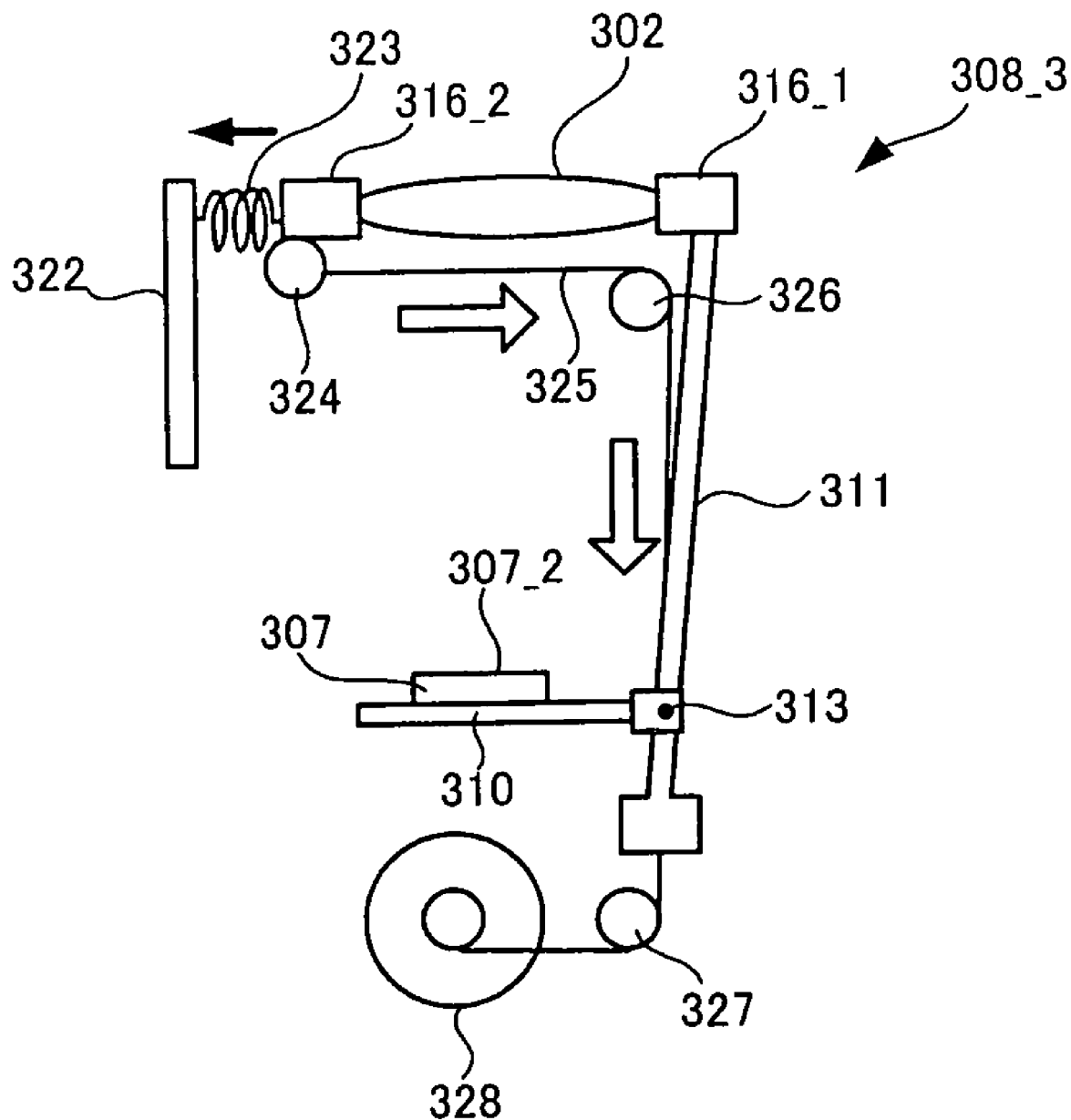
FIG. 10 is a conceptual diagram showing the operation of a power transmission system of a digital camera according to a third embodiment of the invention.

FIG. 10 is a conceptual diagram showing the operation of a power transmission system 308_3 of the digital camera according to the third embodiment of the invention.

The digital camera according to the third embodiment of the invention employs the power transmission system 308_3 having a lens-supporting arm 311 and a spring 323.

The power transmission system 308_3 has only one lens-supporting arm 311 similar to those described above. This lens-supporting arm 311 extends in parallel with an optical axis of subject light while passing close by a side of a CCD 307, and supports a correction lens 302 via one end 316_1 of a lens holder holding the correction lens 302.

The spring 323 of the power transmission system 308_3 is elastic and supports the correction lens 302 by being interposed between a wall 322 and the other end 316_2 of the lens holder. The other end 316_2 of the lens holder is provided with a wire-fixing section 324 that is movable with the spring 323. One end of a wire 325 is fixed to the wire-fixing section 324. The wire 325 runs around the lens holder of the correction lens 302 reaching a motor 328 via a pulley 326 disposed below the one end 316_1 of the lend holder and a pulley 327 disposed below the lens-supporting arm 311. The other end of the wire 325 is fixed to the motor 328.

The motor 328 is a driver for the power transmission system 308_3. The rotation of the motor 328 turns the lens-supporting arm 311 so that the correction lens 302 can move in parallel with an imaging surface 307_2 while resisting a pulling force of the spring 323.

Now, there will be described the operation of the digital camera according to the third embodiment of the invention.

The flowchart shown in FIG. 8 is also applied to the digital camera of the third embodiment. What is different from the flowchart of the digital camera 1 in the first embodiment is a means of controlling the correction lens, which will be described below.

Similar to the first embodiment described above, at step S100, a shake detector 406 activates an acceleration sensor thereof to start processing by a correction-lens controller 407.

The correction-lens controller 407 moves the correction lens 302 according to a result of detection by the acceleration sensor. Specifically, based on a result of detection obtained by the shake detector 406, the correction-lens controller 407 rotates the motor 328 to wind the wire 325. With the winding of the wire 325, the correction lens 302 moves while resisting the pulling force of the spring 323. The correction lens 302 moves in parallel with the imaging surface 307_2 so that a subject image whose blur due to camera shake is corrected can be formed.

After the correction-lens controller 407 has started the processing, upon a press of a release button 15 (step S102), the flow proceeds to step S104.

At step S104, shooting is performed and a CCD 307 obtains analog image signals generated by the shooting.

The flow proceeds to step S106 upon completion of the shooting.

At step S106, the shake detector 406 turns the acceleration sensor off. Subsequently, the correction-lens controller 407 returns the correction lens 302 to the initial position when the correction lens 302 is moved off the initial position, and the processing routine for correcting camera shake ends.

The operation thereafter is the same as that of the digital cameral in the first embodiment and therefore, the description thereof will be omitted.

As described above, it is possible to provide an image-taking apparatus having a refractive optical system, which is reduced in thickness while having a shake correction function.

Incidentally, although the second and third embodiments each employ the motor as a driver, a gear may be used instead of the motor.

What is claimed is:

1. An image-taking apparatus that generates shooting data in response to shooting operation and includes: an imaging device that has an imaging surface and generates image data by reading a subject image formed on the imaging surface; and an image-taking optical system that has an objective lens and a reflection member and forms the subject image on the imaging surface by reflecting subject light coming through the objective lens with the reflection member, the apparatus comprising:

a shake detection section that detects a shake of the image-taking apparatus;

a correction lens that is disposed between the objective lens and the imaging device and capable of moving in parallel with the imaging surface thereby correcting a blur in a subject image formed on the imaging surface caused by the shake of the image-taking apparatus;

a driver that is disposed behind the imaging device and drives the correction lens;

a power transmission system that moves the correction lens by transmitting power from the driver to the correction lens; and a correction-lens control section that causes, based on a result of detection by the shake detection section, the driver to drive the correction lens such that a subject image whose blur due to the shake is corrected is formed on the imaging surface, wherein the power transmission system comprises a lens-supporting arm that supports the correction lens by passing close by a side of the imaging device while extending in parallel with an optical axis of subject light reflected on the reflection member, the lens-supporting arm having a pivot near the side of the imaging device and moving the correction lens, in response to an action of the driver, while keeping the correction lens in parallel with the imaging surface.

2. The image-taking apparatus according to claim 1, wherein the power transmission system comprises a pair of the lens-supporting arms for sandwiching the imaging device, which move the correction lens by tuning on the respective pivots while remaining parallel to each other and keeping the correction lens in parallel with the imaging surface in response to a driving force from the driver.

3. The image-taking apparatus according to claim 2, wherein the driver is an electromagnet that applies an electromagnetic force to the lens-supporting arms.

4. The image-taking apparatus according to claim 2, wherein the driver comprises a cam for rotating the lens-supporting arms according to an attitude of the cam.

5. The image-taking apparatus according to claim 1, wherein the correction lens is supported by the lens-supporting arm as well as a spring fixed to a wall, and the driver drives the correction lens so that the correction lens moves while resisting a force of the spring.

* * * * *